United States Patent
Lindstrom et al.

(10) Patent No.: US 6,299,108 B1
(45) Date of Patent: Oct. 9, 2001

(54) METHOD AND APPARATUS FOR DETECTING SKEW AND ASYMMETRY OF AN AIRPLANE FLAP

(76) Inventors: Jeffrey V. Lindstrom; R. David Reed; Bradley E. Platin; Kevin W. Beyer; David C. Reusch, all of The Boeing Company P.O. Box 3707, M/S 13-08, Seattle, WA (US) 98124-2207

( * ) Notice: Subject to any disclaimer, the term of this patent is extended or adjusted under 35 U.S.C. 154(b) by 0 days.

(21) Appl. No.: 09/209,341

(22) Filed: Dec. 11, 1998

Related U.S. Application Data (60) Provisional application No. 60/069,683, filed on Dec. 12, 1997.

(51) Int. Cl.[7] .................................................. B64K 9/14
(52) U.S. Cl. ....................... 244/213; 244/75 R; 244/194; 340/945
(58) Field of Search ..................................... 244/203, 215, 244/214, 216, 213, 75 R, 194; 324/207.25, 207.21; 338/32 R; 340/945, 686

(56) References Cited

U.S. PATENT DOCUMENTS

| | | |
|---|---|---|
| 2,583,405 * | 1/1952 | Youngman ............................ 244/216 |
| 3,598,999 | 8/1971 | Hofmeister . |
| 3,841,589 | 10/1974 | Appleby et al. . |
| 3,874,617 * | 4/1975 | Johnson ............................... 244/216 |
| 3,935,754 | 2/1976 | Comollo . |
| 4,181,276 | 1/1980 | Kogure et al. . |
| 4,248,395 * | 2/1981 | Cole ..................................... 244/216 |
| 4,256,277 | 3/1981 | Embree . |
| 4,260,121 | 4/1981 | Baston et al. . |
| 4,521,060 | 6/1985 | Linton . |
| 4,789,119 | 12/1988 | Bellego et al. . |
| 5,628,477 | 5/1997 | Caferro et al. . |
| 5,680,124 | 10/1997 | Bedell et al. . |
| 5,686,907 | 11/1997 | Bedell et al. . |
| 5,754,042 * | 5/1998 | Schroeder et al. ............... 324/207.25 |

* cited by examiner

Primary Examiner—Galen L. Barefoot (57) ABSTRACT

An accurate and compact flap skew detection system that operates independent of the flap-drive system comprises, in a preferred embodiment, three major elements; a rotary position sensor located on fixed wing structure; a push-pull link and crank arm to convert translational flap motion into rotary sensed motion at the sensor; and a computer processing means to process the rotational sensed information and to compute a flap skew algorithm. Inter-flap and intra- flap translational motion is sensed and compared using a plurality of rotary sensors. Sensors falling outside of predetermined limits or violating control law rules indicate a non-synchronous or asymmetrical "skewed" condition.

6 Claims, 8 Drawing Sheets

METHOD AND APPARATUS FOR DETECTING SKEW AND ASYMMETRY OF AN AIRPLANE FLAP

REFERENCE TO RELATED APPLICATION

The present application claims the benefit of U.S. Provisional Application 60/069,683, filed Dec. 12, 1997, which is incorporated herein by reference.

FIELD OF THE INVENTION

This invention generally relates to a system and apparatus for detecting and signaling the presence of an undesired misalignment of one or more of several aligned elements, and more particularly, to a system for monitoring the alignment of a series of adjacent slats or flaps on an aircraft wing.

BACKGROUND OF THE INVENTION

High lift devices for aircraft wings are sometimes referred to as auxiliary airfoils. Such devices or airfoils are extended from the leading or trailing edges of the wing to increase aerodynamic lift during takeoff and landing of the aircraft. When extended from the wing, the high lift devices increase the effective size, curvature, camber and area of the wing, thereby increasing the lift of the wing for slow speed flight. High lift devices extending from the leading edge of the wing are usually known as slats and those extending from the trailing edge of the wing are known as flaps.

Normally, each high lift device is deployed by two separate but coordinated drive mechanisms, one on the inboard side and the other on the outboard side of the high lift device. Should one of these mechanisms be unable to perform its function, a skewing of the high lift device may occur and jamming or loss of the high lift device may result.

The majority of modern airplane high lift drive systems use actuation methods where all flap drive system elements are driven in synchronization. Because of the tight mechanical coupling of the elements, any element losing synchronization with the rest of the system may cause a mechanical failure and, more importantly, the possibility of a skewed flap, i.e., a high lift flight control surface that is in an asymmetrical position. Undetected skewed flaps are a cause for concern due to the possibility of unpredictable airplane handling characteristics. Recent airplane certification requirements have reacted to this concern by mandating the incorporation of flap skew detection systems in new airplane designs. A problem in designing such a system is that there will always be the relatively smaller skewing movements caused by normal structural deflections, dynamics of the aircraft and temperature changes that would not adversely affect airplane handling characteristics but could confuse such a detection system.

SUMMARY OF THE INVENTION

The invention provides a system to accurately detect skewing or loss of high lift devices. In a preferred embodiment, the invention provides improved detection and actuation devices that will accurately detect skewed or lost high lift surfaces, to warn the air crew of degraded aircraft performance, and to shut down the high lift drive system to prevent the possibility of further aircraft damage. In a preferred embodiment, the system comprises three major elements: a rotary position sensor located on fixed wing structure; a push-pull link and crank arm to convert translational flap motion into rotary motion sensed at the sensor; and a computer processing means to process the sensed rotational information and compute a flap skew algorithm. In the preferred embodiment, inter-flap and intra-flap translational motion is sensed and compared using a plurality of rotary sensors. Sensors falling outside of expected or predetermined limits or violating control law rules indicate a non-synchronous or asymmetrical "skewed" condition.

The crank assembly of a preferred embodiment includes means for supporting the rotary sensor, a means for supporting the crank, a means for transmitting crank rotation to the rotary sensor, means for providing an index for adjusting the length of the ink assembly, means for indexing the sensor to its proper input angle. The link assembly includes means for converting flap carriage motion into crank rotation, and means for adjustment of the crank angle, and thus the sensor input angle, at the rig position. (This insures that sensor outputs will be balanced during normal operation). The rotary analog sensor includes means for converting rotary motion of the crank assembly into a voltage signal, which varies predictably with crank angle. A Flap/Slat Electronics Unit (FSEU) includes means for comparing sensor output voltages, means for providing a signal to stop the drive system movement in the event that the sensor voltage deviates from a predetermined value, and means for providing an indication to the pilot that a flap skew has occurred.

DESCRIPTION OF THE PREFERRED EMBODIMENT

Figure 1:
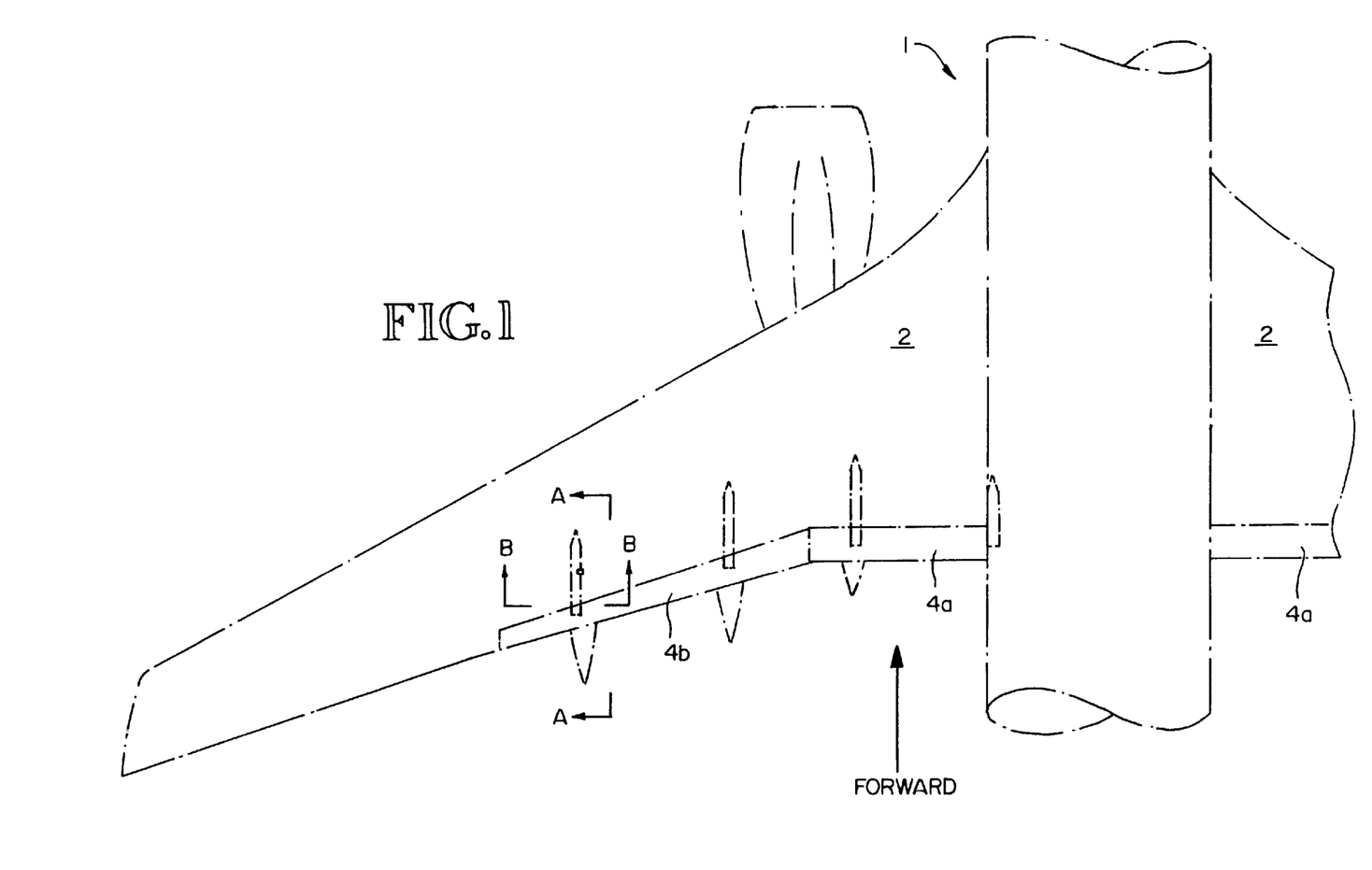
FIG. 1 is a plan view from above an aircraft showing the location of the flaps and flap tracks on the left wing; right wing is symmetrical.
Figure 2:
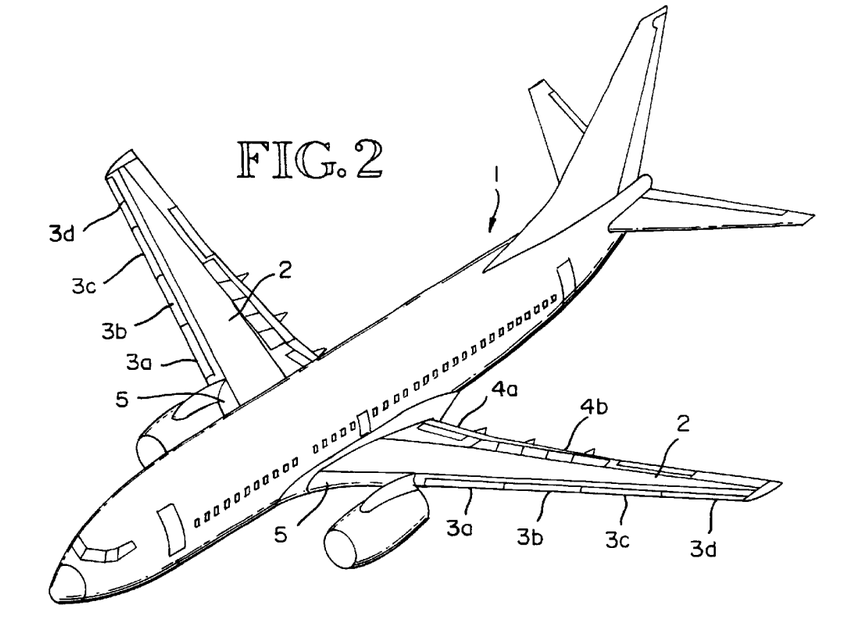
FIG. 2 is a perspective view of an embodiment of an aircraft showing location and operating position of high lift surfaces.

With reference to FIGS. 1 and 2, an aircraft 1 has wings 2, each wing provided with high lift devices in the form of leading edge slats 3a, 3b, 3c, 3d and trailing edge flaps 4a, 4b. As can be best seen in FIGS. 3 and 4, a trailing edge flap mechanism may include a main flap 6 and an aft flap 9. The illustrated aircraft embodiment also has leading edge flaps 5. For purposes of illustration in the description below, reference will sometimes be made to flaps alone or slats alone. It will be understood that the inventive concept is applicable to any auxiliary airfoil device.

Figure 5A:
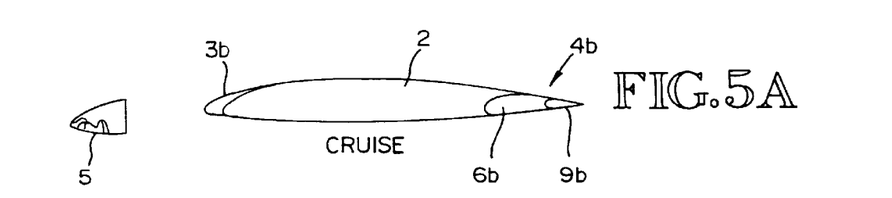
FIGS. 5A, 5B and 5C are schematic cross-sectional views of a wing showing flaps and slats in various positions.
Figure 5B:
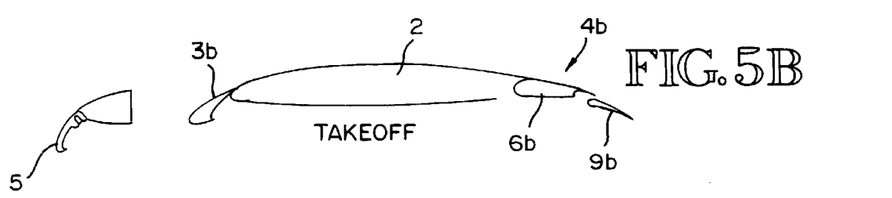
Figure 5C:
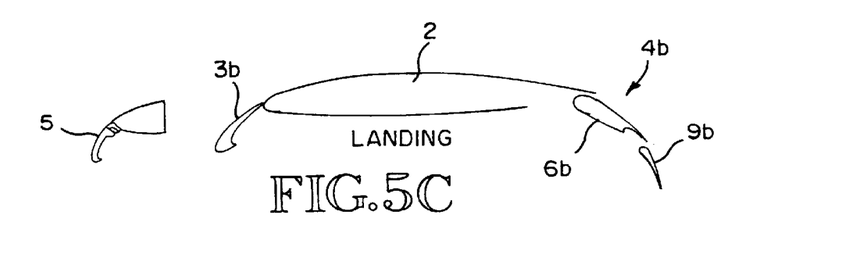

FIGS. 5A, 5B and 5C schematically show the various positions of the auxiliary airfoil elements (ie., flaps and slats) in various flight modes. In cruise mode, the flats and slats are retracted as shown in FIG. 5A. In takeoff position, the flaps and slats are in an extended position, as shown in FIG. 5B. In landing position, slats and leading edge flaps 5 are in an extended position, and trailing edge flaps 4a, 4b are in a fully extended position.

With reference to FIGS. 3, 5, 6, 7 and 8, during normal operations, the pilot commands flap position via flap lever in cockpit. The flap lever position commands a power drive unit 7 to extend or retract flaps 4a, 4b. A control valve on the power drive unit ports hydraulic fluid to the motor which, via a gearbox 8, rotates shafts 10 along the wing trailing edge (in the illustrated embodiment) to eight transmissions 12 (two per flap). Each transmission 12 powers a ballscrew 14. As the ballscrew 14 rotates, the ballnut 16 translates along the ballscrew 14. A gimbal 18 supports the ballnut 16 on the flap carriage 20, and thus causes the flap carriage 20 to move with the ballnut 16. Each carriage 20 is supported by a flap track 22, which is attached to the wing 2. Two carriages 20 support each flap. As the carriages 20 move along the flap track 22, the flap extends or retracts in accordance with the pilot's command.

Figure 6:
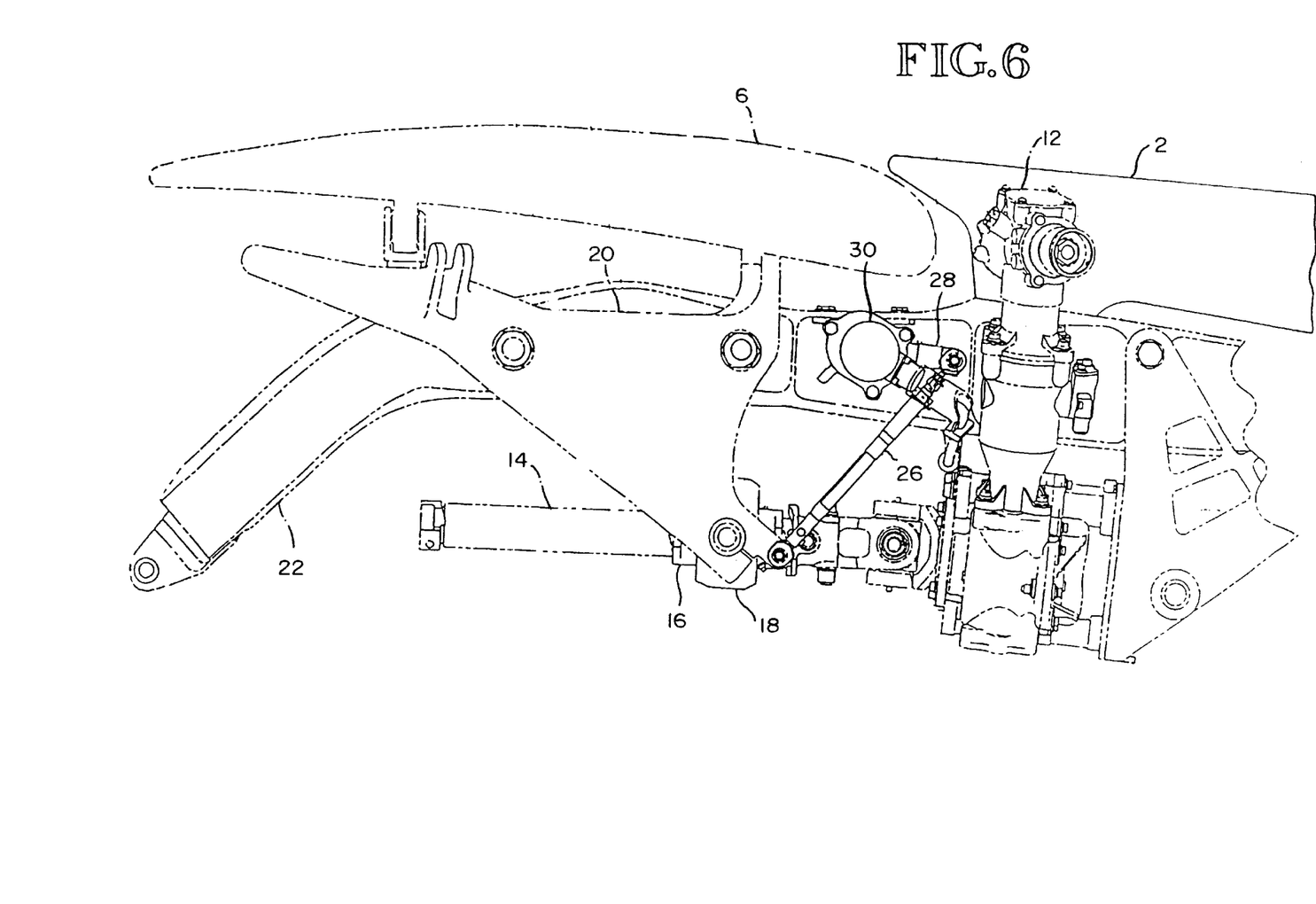
FIG. 6 is a perspective view of a preferred embodiment of the invention with the flaps retracted, or cruise, position, taken along line A—A of FIG. 1.
Figure 7:
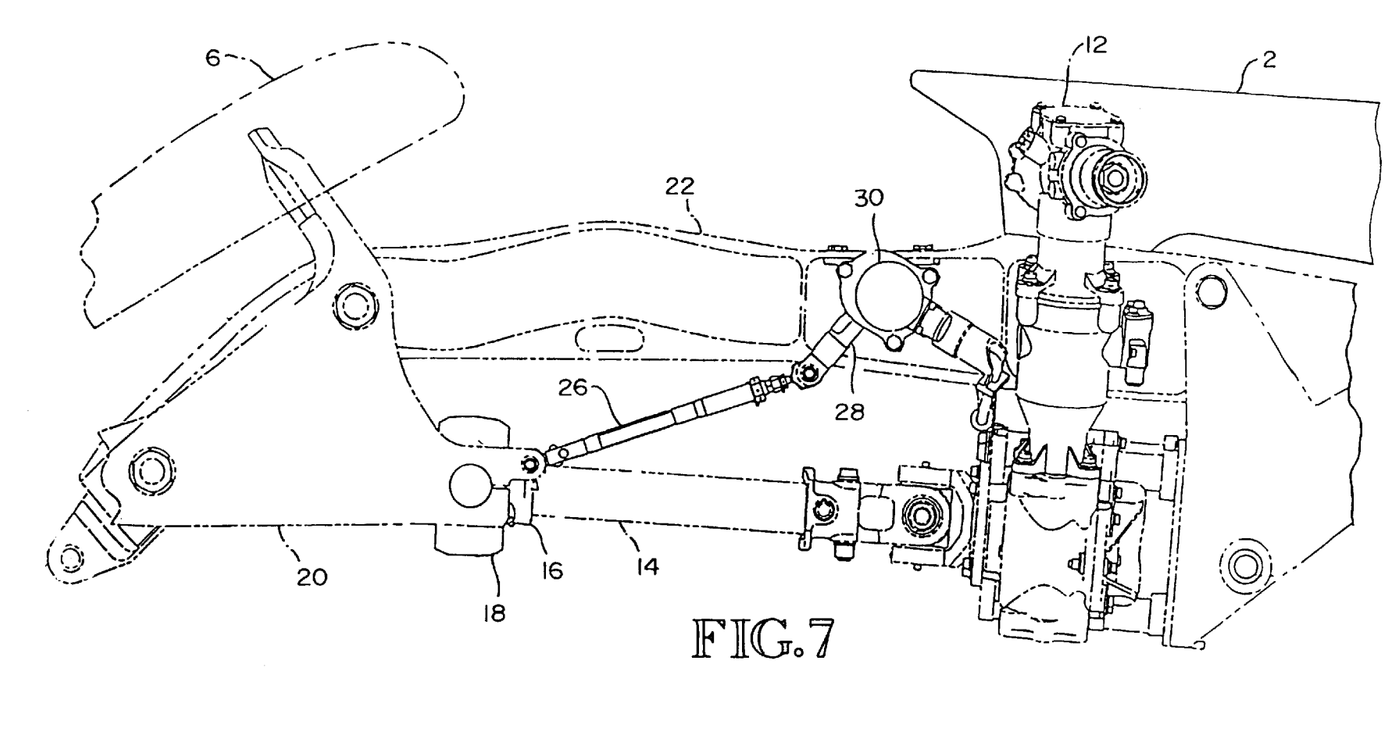
FIG. 7 is a perspective view of a preferred embodiment of the invention with the flaps extended, or landing, position, taken along line A—A of FIG. 1.
Figure 8:
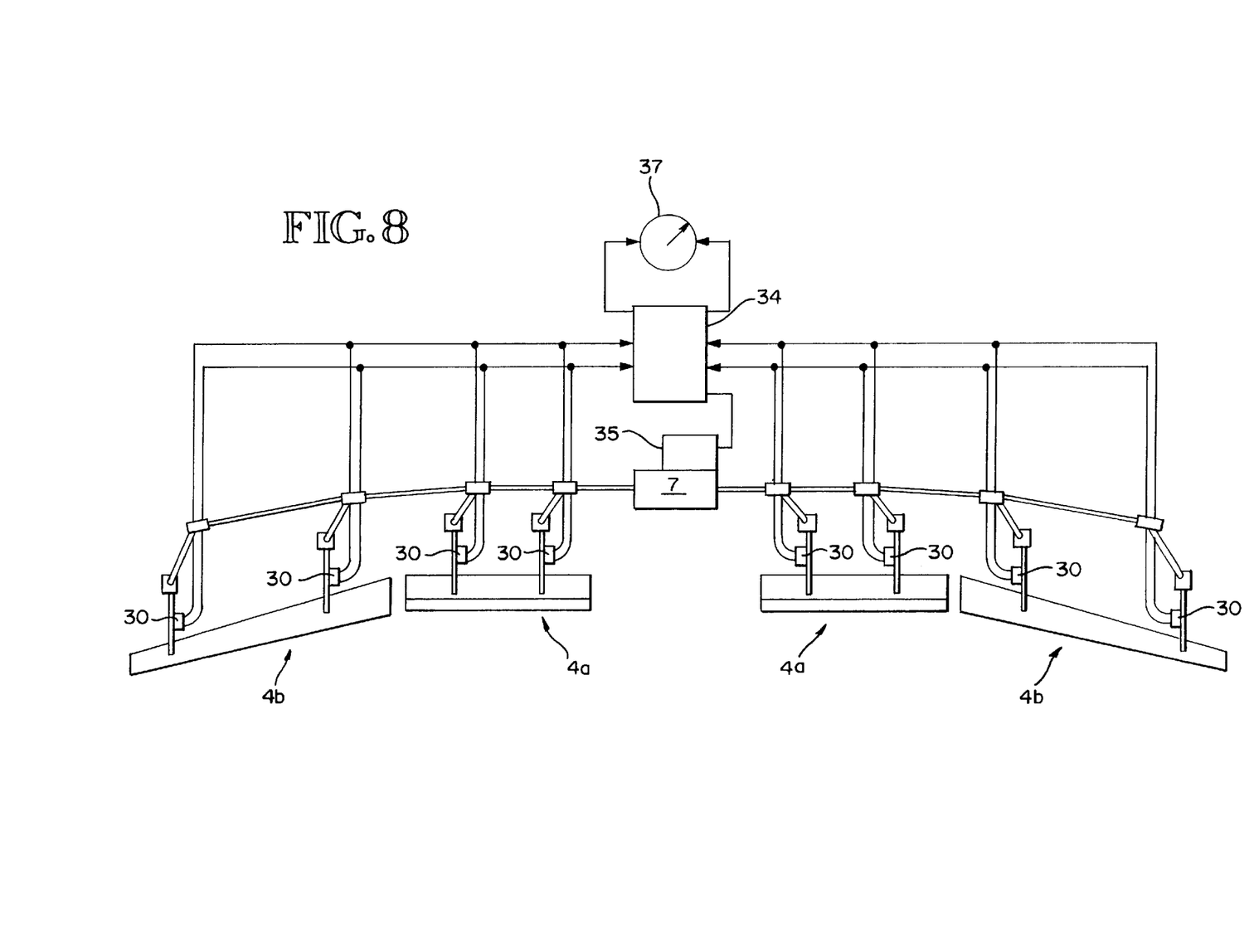
FIG. 8 is a schematic of the flap skew detection and shutdown system of a preferred embodiment.
Figure 9:
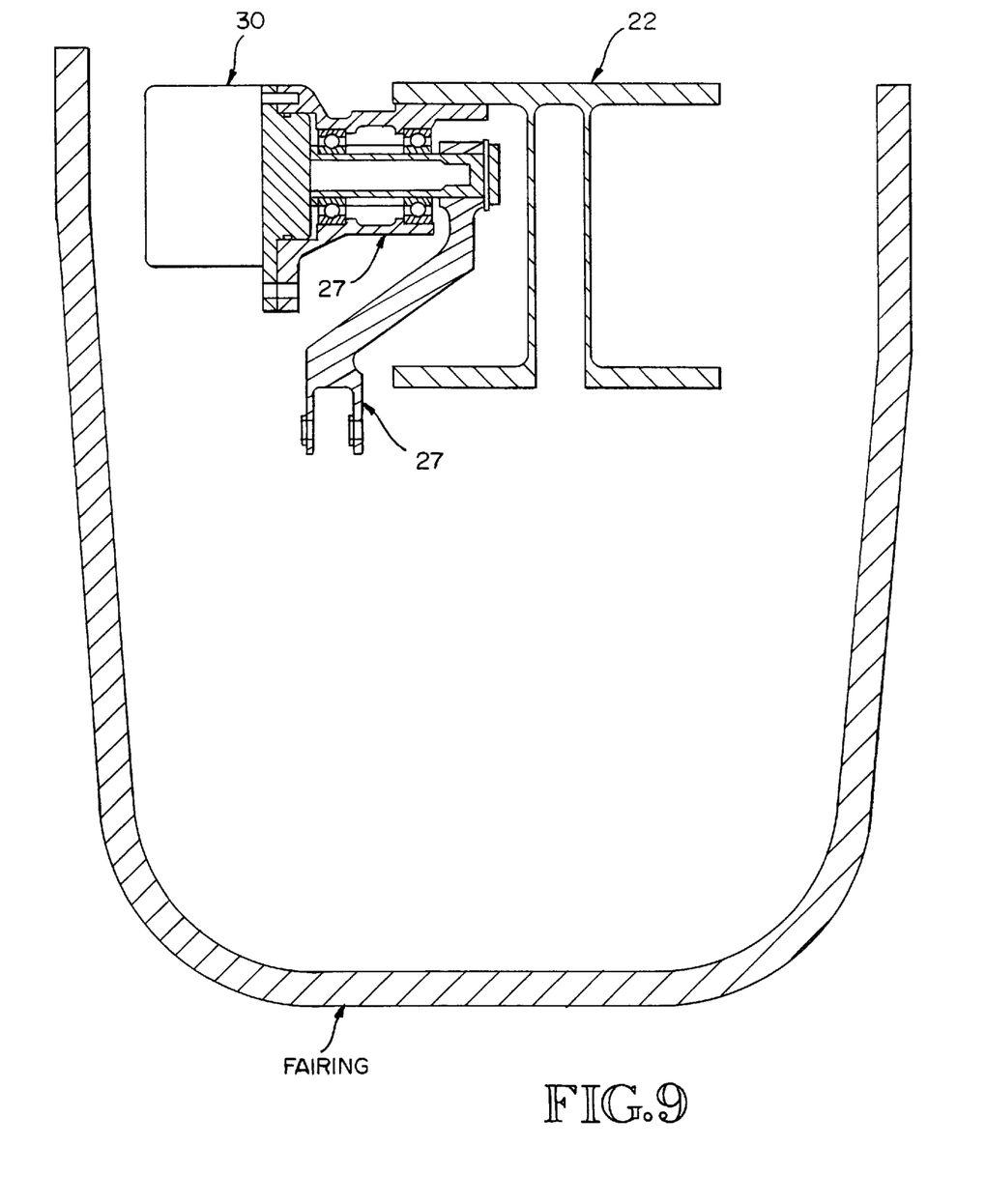
FIG. 9 is a view taken along line B—B of FIG. 1.

Referring now to FIGS. 6, 7 and 9, in a preferred embodiment, an apparatus for sensing positions of the auxiliary airfoil elements includes a link 26; a crank assembly 27 with its crank 28 attached to the link 26; a rotary sensor 30 attached to the housing 32 of the crank assembly 27; and a flap/slat electrical unit (FSEU) 34 (see, e.g., FIG. 8). In this embodiment, the crank assembly 27 responds to motion of the link 26, and the crank assembly 27 transmits a rotary response to the rotary sensor 30. In one embodiment, the airfoil elements are attached to the flap carriage track 20, and the link 26 provides means for converting flap carriage motion into rotary motion.

In a preferred embodiment, one skew sensor is installed at each trailing edge ballscrew drive. The sensor 30 is driven by a crank and linkage assembly which is driven by the carriage 20. Position is sensed by a rotary sensor, as described in greater detail below. The sensor 30 has internal gearing to magnify the input to the synchro.

Motion of the flap carriage 20, along the flap track 22, is transmitted to the crank assembly 27, via the link 26. The sensor 30 receives rotary input from the crank assembly 27, and produces an analog voltage signal which varies predictably with crank angle. Wires carry the voltage signal from each of the eight sensors 30 to the FSEU electronic control box 34, where the voltage signals are compared (see FIG. 8). During normal operation, differences between voltage signals is quite low. If, however, there is a failure at any one of the eight flap supports that results in the carriage being out of position relative to the others, the corresponding sensor output signal will be higher or lower than expected. When that signal difference exceeds a predetermined level, the electronic control box 34 will send a signal to close the shutoff valve 35, thus stopping the power drive unit 7 from driving the system any farther. This prevents the drive system from damaging the flap or from creating a greater asymmetric lift condition. In addition, the electronic control box 34 sends a signal to the cockpit indicator 37, alerting the pilot of the malfunction and drive shut-down.

Figure 3:
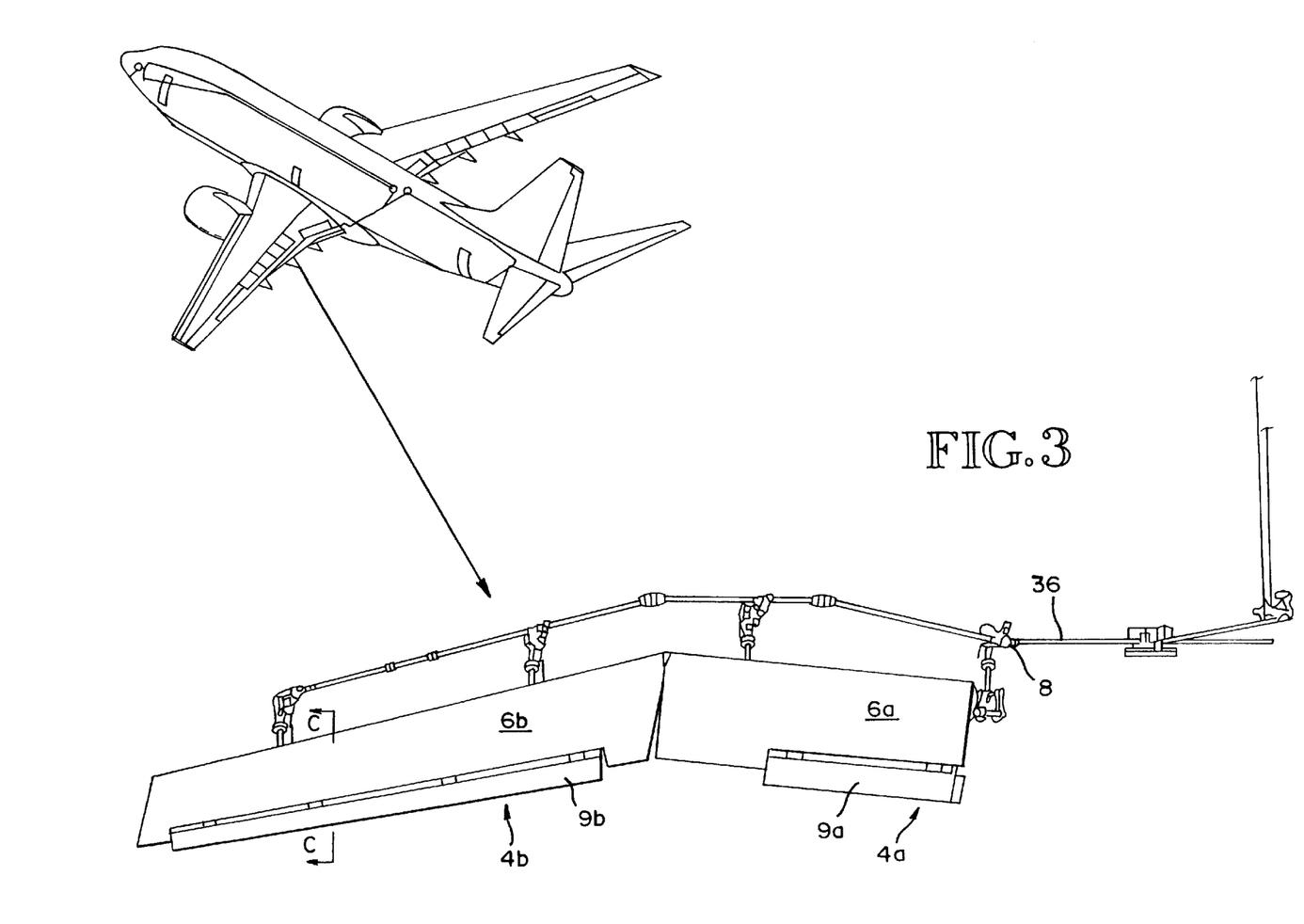
FIG. 3 is a schematic of an embodiment of a trailing edge mechanical drive system.
Figure 4:
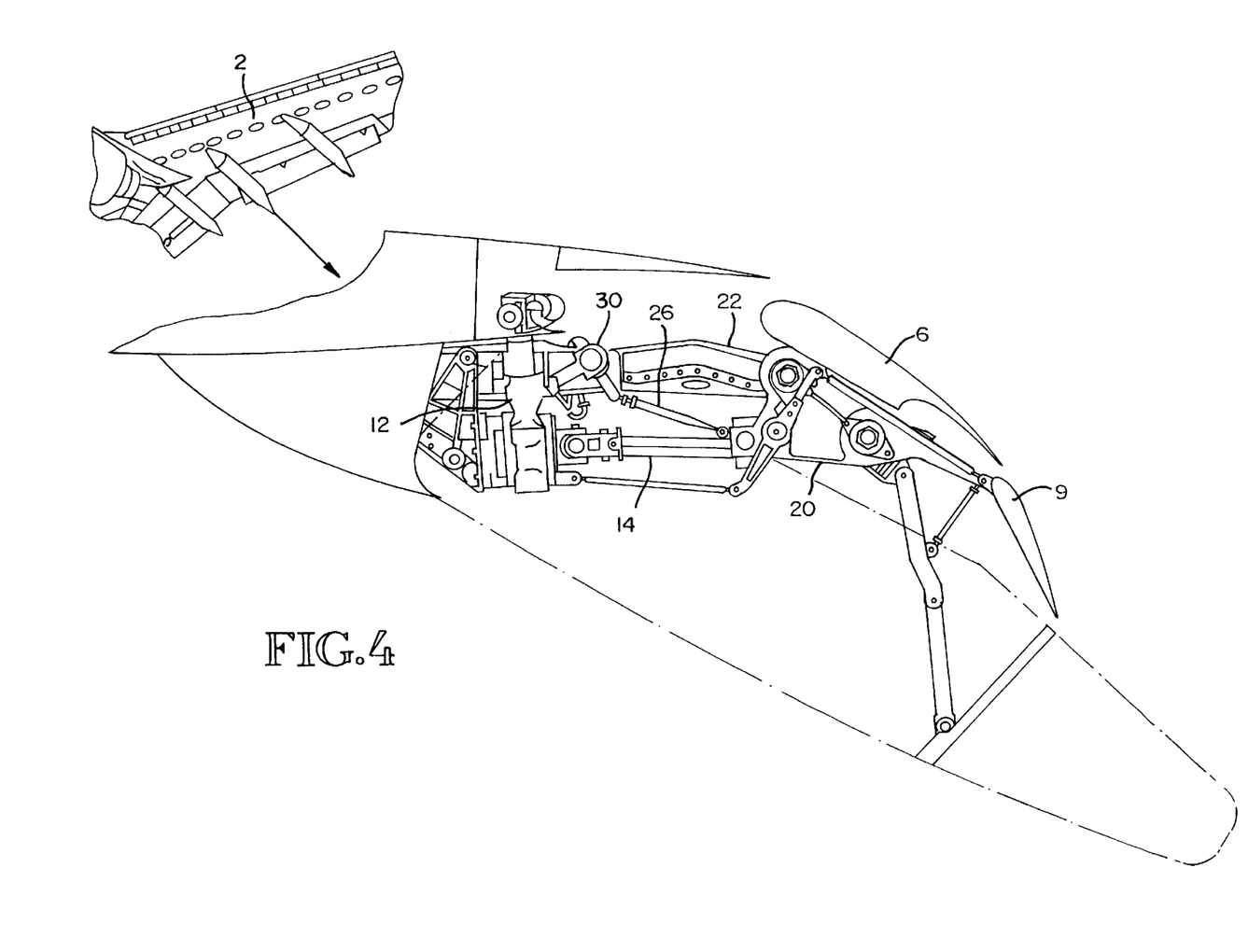
FIG. 4 is a detailed cross-sectional view of one of the eight trailing edge flap actuation and support installations of a preferred embodiment, taken along line C—C of FIG. 3.

The trailing edge skew protection function protects against failures downstream of the flap torque tube 36 (i.e., angle gearboxes, flap transmission, u-joints, and ballscrews), as best seen in FIG. 3. Shutdown protection is provided in normal mode by the Flap/Slat Electronics Unit 34, and the trailing edge bypass valve. No protection is provided in alternate mode because skewed deployment in alternate mode requires two failures (one failure that disables normal mode and one failure that causes the skew). Indication of skewed deployment is continuously available.

The FSEU 34 reads a sensor 30 at each trailing edge ballscrew 14. Skew is preferably computed by comparing symmetric sensors (position 1 is compared with position 8, 2 with 7, etc.), instead of comparing the two sensors on a flap panel. This simplifies the control law, because symmetric pairs have identical kinematics. The trailing edge bypass valve is commanded to the bypassed position, thereby shutting off the trailing edge drive system, when skewed deployment is detected by the FSEU. The trip thresholds and time delays are sized to prevent the skew from exceeding a structural requirement of 14 percent of full stroke in the illustrated embodiment. Preferably, the FSEU latches a skew event after 2.0 seconds. A latched event preferably can not be reset in-flight.

While the invention has been described by way of exemplary embodiments, the claims are not limited to the embodiment described herein. Equivalent devices or steps may be substituted for those described, and operate according to the principles of the present invention and fall within the scope of the claims. The inventive concept has been described with reference to trailing edge flaps, for purposes of illustration. It will be understood that the concept is likewise applicable to slats, and to arrangements and configurations of slats and flaps that differ from the illustrative embodiment

What is claimed is:

1. An apparatus for sensing position of a plurality of auxiliary airfoil elements on an aircraft wing, comprising:

plurality of links associated with and adapted for moving the auxiliary airfoil elements;

a plurality of crank assemblies, each assembly having a housing and a crank, the crank being attached to a respective one of the links, the crank assemblies and links converting translational motion of the auxiliary airfoil elements into rotary motion; and a plurality of rotary position sensors for detecting rotary motion of the crank assemblies and links, each sensor being attached to a respective housing of one of the crank assemblies;

wherein each crank assembly responds to motion of the corresponding one of said links, and said crank assembly transmits a rotary response to said rotary sensor to detect skew or loss of the auxiliary airfoil elements.

2. The apparatus of claim 1 further comprising a comparator associated with the rotary position sensors for receiving outputs from at least two rotary sensors and for comparing the outputs to determine a skewed condition of the auxiliary airfoil elements.

3. The apparatus of claim 2 wherein each auxiliary airfoil element is attached to a carriage track having a flap carriage, and wherein the links convert flap carriage motion into rotary motion.

4. The apparatus of claim 2 wherein each link is attached to a corresponding crank assembly and each crank assembly support one of the rotary position sensors.

5. The apparatus of claim 2 wherein each crank assembly is attached to a flap track and one rotary sensor is attached to each crank assembly.

6. A method for detecting a skew or loss condition of high life surfaces in an aircraft, comprising the steps of:

(a) attaching a rotary position sensor in fixed wing structure;

(b) detecting rotary motion of a push-pull link and associated crank arm for converting translational flap motion of the high lift surfaces into rotary motion detectable by the sensor; and (c) comparing the detected rotary motion with a flap skew algorith to identify a skew or loss condition of the high lift surfaces.

* * * * *